Figure 1:
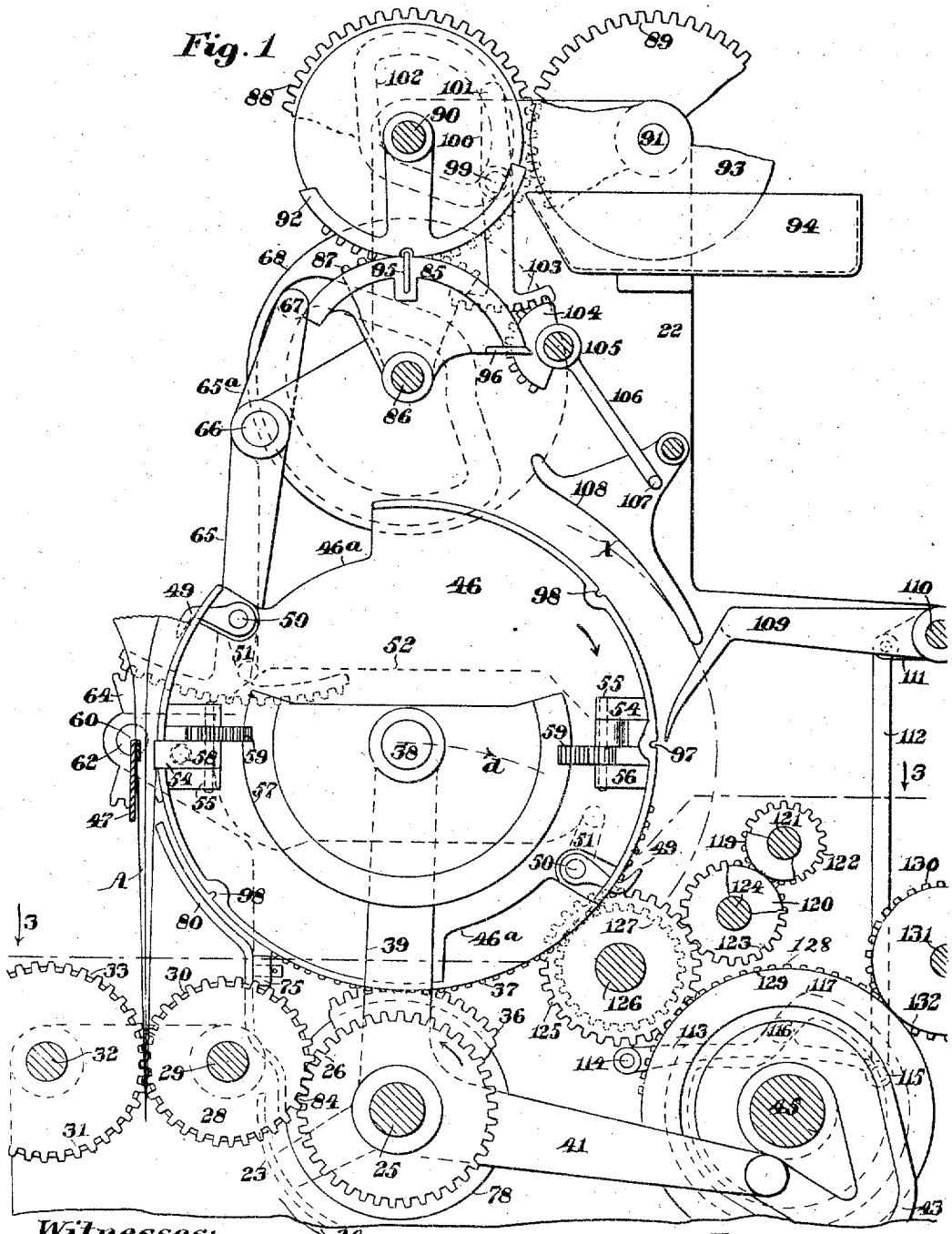

No. 11,880. Reissued Jan. 1, 1901.

G. MORTSON.

PAPER BAG MACHINE.

(Application filed Sept. 6, 1900.)

5 Sheets—Sheet 1.

Witnesses:
Walter E. Lombard
Wm P. Laraway

Inventor:
George Mortson
By his Attorney
C. A. Whitney

No. 11,880. Reissued Jan. 1, 1901.

G. MORTSON.

PAPER BAG MACHINE.

(Application filed Sept. 6, 1900.)

5 Sheets—Sheet 2.

Witnesses:
Walter E. Louiard
Wm. P. Laraway

Inventor:
George Mortson
By his Attorney
E. L. Whitney

No. 11,880. Reissued Jan. 1, 1901.

G. MORTSON.

PAPER BAG MACHINE.

(Application filed Sept. 6, 1900.)

5 Sheets—Sheet 3.

*Witnesses:*

Walter C. Lombard

Wm. P. Laraway

*Inventor:*

George Mortson

By his Attorney

E. G. Whitney

No. 11,880. Reissued Jan. 1, 1901.

G. MORTSON.

PAPER BAG MACHINE.

(Application filed Sept. 6, 1900.)

5 Sheets—Sheet 4.

Witnesses:

Walter E. Lombard,

Wm. P. Laraway

Inventor:

George Mortson

By his Attorney

E. E. Whitney

No. 11,880. Reissued Jan. 1, 1901.

G. MORTSON.

PAPER BAG MACHINE.

Application filed Sept. 6, 1900.

5 Sheets—Sheet 5.

Witnesses:

Walter E. Lombard

Wm. P. Laraway

Inventor:

George Mortson

By his Attorney

C. E. Shelbey

UNITED STATES PATENT OFFICE.

GEORGE MORTSON, OF HARTFORD, CONNECTICUT, ASSIGNOR TO F. W. LEINBACH, OF BETHLEHEM, PENNSYLVANIA; MARY E. LEINBACH AND JOHN E. LEINBACH ADMINISTRATORS OF SAID F. W. LEINBACH, DECEASED.

PAPER-BAG MACHINE.

SPECIFICATION forming part of Reissued Letters Patent No. 11,880, dated January 1, 1901.

Original No. 614,123, dated November 15, 1898. Application for reissue filed September 6, 1900. Serial No. 29,193.

*To all whom it may concern:*

Be it known that I, GEORGE MORTSON, a citizen of the United States of America, and a resident of the city and county of Hartford, in the State of Connecticut, have invented certain new and useful Improvements in Paper-Bag Machines, of which the following is a specification.

This invention relates to a machine for automatically manufacturing square-bottom paper bags from tucked-paper tubes properly severed into bag lengths, and in the construction and organization thereof shown in the accompanying drawings is especially adapted for manufacturing paper bags such as described in Reissue Letters Patent No. 10,083, although certain elementary features of this machine are susceptible of use in other machines for the manufacture of other kinds of bags.

One object of this invention is to provide an improved, simplified, efficient, and rapidly-operating machine for taking a tucked-paper tube severed into bag lengths by any mechanism well known in the art and folding the diamond, (which is the most difficult part of the operation of making square-bottom bags on account of the intricacy of the right-angle triangular folds,) and then pasting, cross-folding, and finally closing the flaps to complete the bag.

A further object of the invention is to provide in a paper-bag machine improved diamond-forming mechanism embodying a progressively-rotating member and an intermittently-operative rotary reciprocatory or oscillatory member, the latter of which members has a fixed axis of movement, and the former of which members is adapted for intermittent bodily oscillatory movements away from and toward the member having the fixed axis, and the former of which members constitutes the folding-bed and includes devices for engaging and holding the lower ply of the tube during the diamond-forming operation, and the latter of which members constitutes a tucker-plate and includes devices for engaging and holding the upper fold or tuck of the tube during the diamond-forming operation and coöperates with the folding-bed during the oscillatory movement of the former member away from the latter to open the bottom-forming end of the tube and fold the same into diamond form.

With these and other objects in view the invention consists in certain constructions and in certain parts, improvements, and combinations, as will be hereinafter described, and more fully pointed out in the claims.

Figure 2:
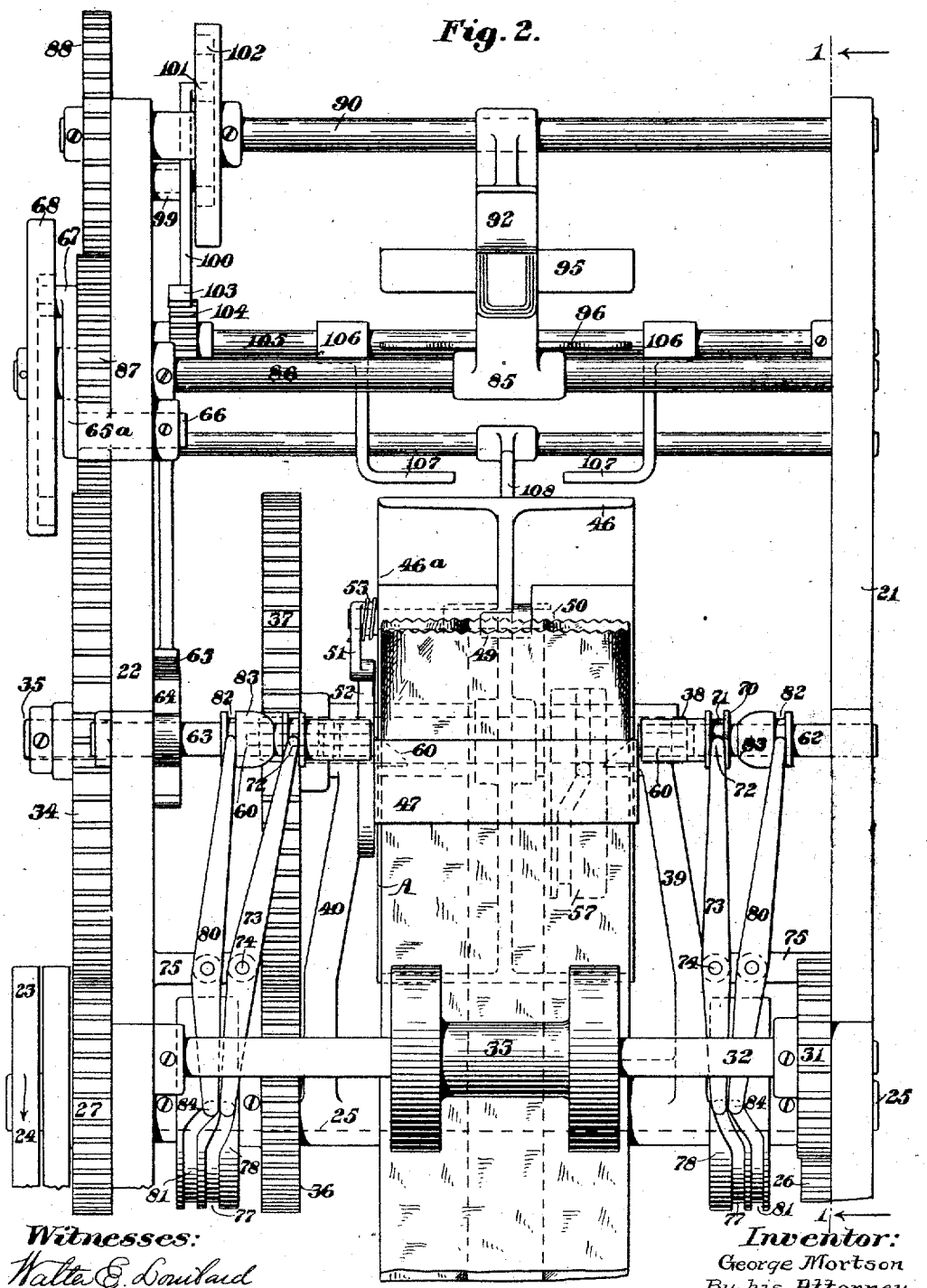
Figure 3:
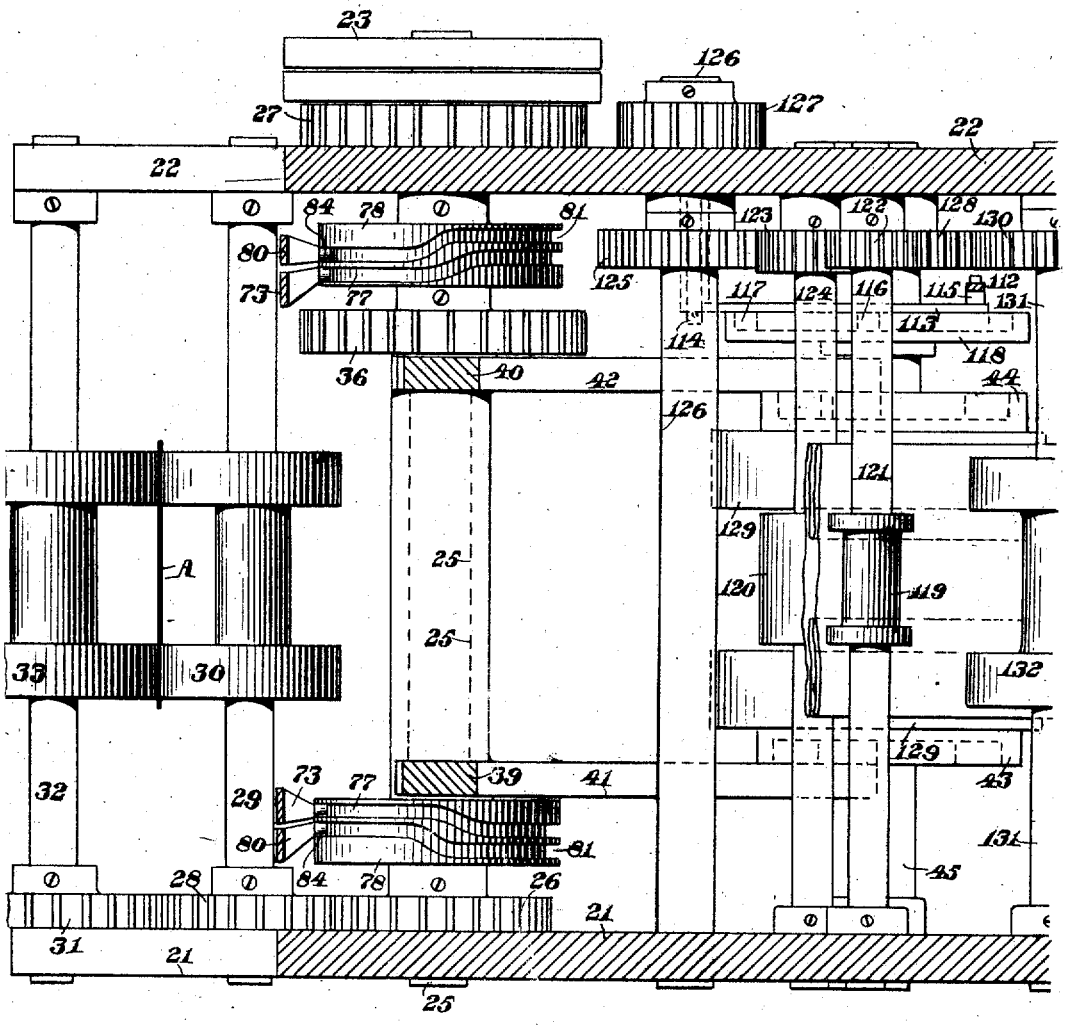
Figure 17:
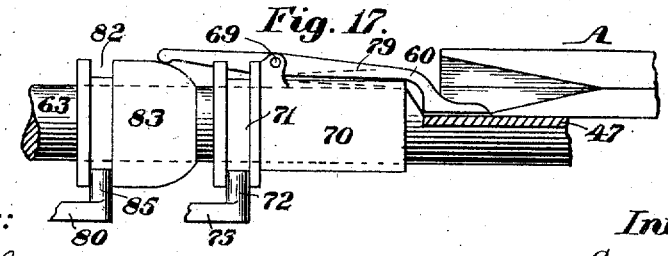
Figure 14:
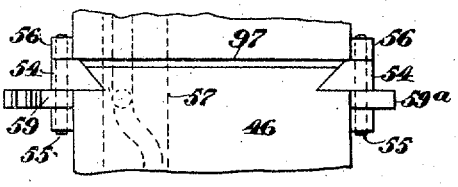
Figure 16:
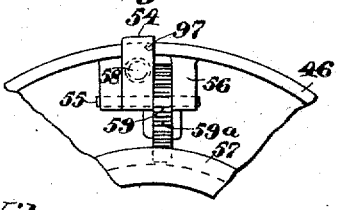
Figure 15:
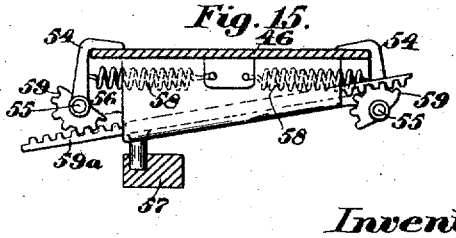

In the drawings accompanying and forming part of this specification, Figure 1 is a right-hand side sectional elevation of the machine, the section being taken on line 1 1 of Fig. 2 and looking in the direction of the arrow and showing the tubular blank held by the bottom-forming mechanism ready to be operated upon. Fig. 2 is a front elevation of that portion represented in Fig. 1. Fig. 3 is a sectional plan view taken on the dash-and-dot line 3 3 of Fig. 1 and looking in the direction of the arrows. Figs. 4 to 13, inclusive, are diagrammatic plan and edge views of the bag-blank at successive stages of the completion of the diamond form. The views are drawn on an enlarged scale and show the relative positions of the oscillating tucker-plate with its nippers and the positions of the cylinder produced by the combination of its rotary and vibratory motions and with its side and front clips thereon. Figs. 14, 15, and 16 are respectively front, plan, and side views of the oppositely-disposed bevel-edged side clips mounted on the cylinder; and Fig. 17 is an enlarged view of the nipper and mode of operating the same.

In the following specification, of which the accompanying drawings form a part, similar characters of reference designate like or equivalent parts wherever found throughout the several views.

As a preamble to a detailed description of the construction, organization, and mode of operation of the several parts it is desired to say that in the present machine the folding-bed is shown as a cylinder having two independent axes of movement—one a movable axis about which said cylinder rotates and the other a fixed axis, about which said cylinder is adapted to be intermittently oscillated or vibrated to the extent required to permit the tucker-plate to move from its normal vertical position through an arc of about one hundred and eighty degrees, said plate being shown mounted in stationary bearings and adapted for oscillatory motion or, more correctly speaking, rotary reciprocatory movements. The cylinder is provided with mutilations or has portions broken away, which permit the tucker-plate to oscillate back from its upper position to its normal position. In my present invention I accomplish these objects as follows: A tucked-paper tube severed into bag-blank lengths is delivered from a set of feed-rolls into the the bottom-forming mechanisms for forming the characteristic primary transverse folding-line, unfolding the tucks, and forming the inside triangular folds. The pasting, cross-folding, and closing of the flaps may be done by any well-known means and in any well-known manner.

In the construction shown the bottom-forming mechanism includes a tucker-plate having a fixed axis of rotary reciprocatory or oscillatory movement and provided with bevel-edged side nippers trunnioned in stationary frames and arranged to vibrate above the tubular blank in such manner that as the bottom-forming end of the tube passes along beneath the same the bevel-edged side nippers swing into the tucks of the tube and clasp and hold them to the tucker-plate substantially in that position where the corners of the bag-bottom are to be located. The bed, upon which the bag-blank rests and upon which it is carried around, is represented as a cylinder, and this cylinder is provided with a pair of bevel-edged side clips and a front clip, the former adapted to swing into the tucks of the bellows side tube and hold the plies of the lower tucks substantially in that position where the corresponding corners of the bag-bottom are to be located and the latter arranged to swing down on the lower ply of the tube and hold the same to the cylinder. The tube being thus held by the tucker-plate on one side and the cylinder on the other, a rotary reciprocatory movement is imparted to said tucker-plate, and the cylinder, which is then rotating, is simultaneously oscillated about its fixed axis in a direction away from the tucker-plate, a rotary reciprocatory movement of the tucker-plate causing the same to define the primary transverse folding-line in the blank and the rotary advancing and oscillatory movements of the cylinder away from and toward the tucker-plate axis, combined with the rotary reciprocatory movement of said tucker-plate, causing the forward end of the tube to be opened or unfolded lengthwise and reshaped or refolded into diamond form, as will be hereinafter more fully described.

The bed or main framework, which may be of any suitable construction to support the various frames and mechanisms, has on opposite sides thereof the uprights 21 and 22, in which the various shafts of the mechanisms are journaled, as hereinafter more fully described.

Motion is communicated to the machine by means of the pulley 23, driven in the direction of the arrow 24, (see Figs. 1 and 2,) fastened to the driving-shaft 25, which is journaled in the uprights 21 and 22 and carries on the inner side of the upright 21 a gear 26 and on the outer side of the upright 22 a gear 27, from which the different mechanisms are driven. The gear 26 meshes into the gear 28, which is fastened to the shaft 29, which is journaled in the uprights 21 and 22 and has fixed upon it the rear feed or drawing roll 30. The gear 28 meshes into the gear 31, which is fastened to the shaft 32, also journaled in the uprights 21 and 22, and has fastened thereto the front drawing-roll 33.

By the means above described a continuous rotary motion is transferred from the driving pulley and shaft to the drawing-rolls, and thereby the tucked-paper-tube blank A, which has been previously severed into bag-blank lengths, is delivered into the bottom-forming mechanism, which performs its respective functions, as will now be explained.

On the left-hand side of the upright 22 and fastened upon the shaft 25, as previously stated, is the gear 27, which meshes into the large intermediate gear 34, which is rotatably mounted on the stud 35, fastened to the upright 22 and from which the upper part of the machine is driven. The shaft 25 has also fastened to it driving-gear 36, meshing with the cylinder-gear 37, which is fastened upon the end of the shaft 38, which in turn is journaled in the arms 39 and 40, which are mounted for oscillation on the shaft 25, and whose downward and rearward extending arms 41 and 42 engage, by means of their projections, the grooves of the cams 43 and 44, which are fastened to the shaft 45, which is rotatably journaled in the uprights 21 and 22.

Figure 4:
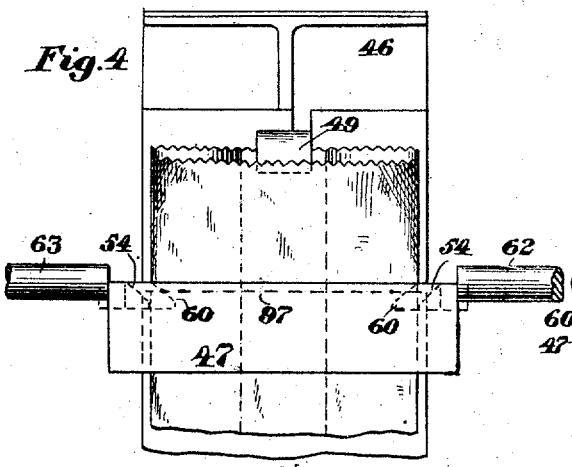
Figure 5:
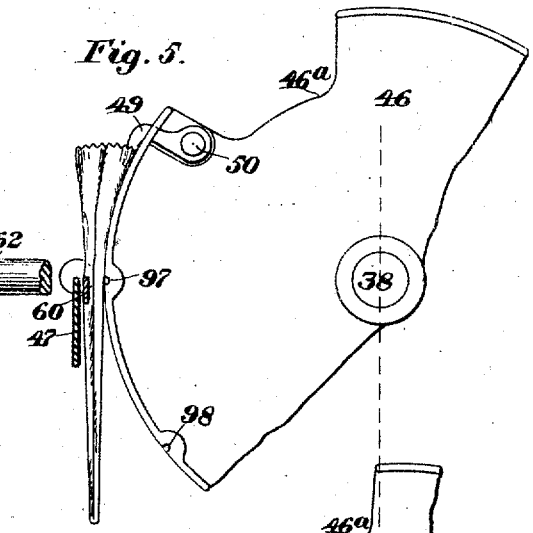
Figure 6:
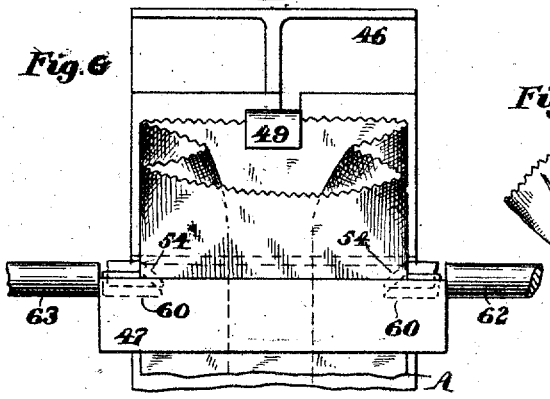
Figure 7:
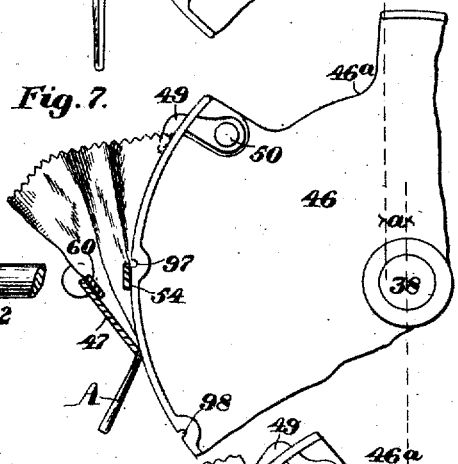
Figure 8:
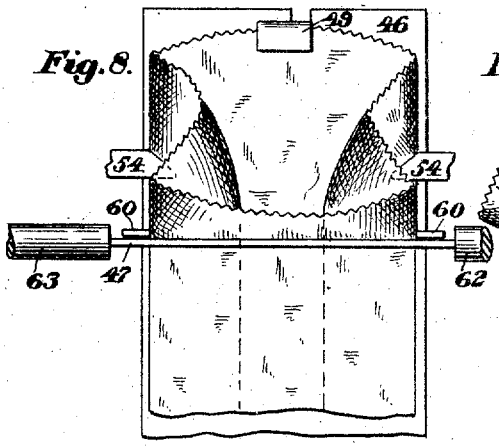
Figure 9:
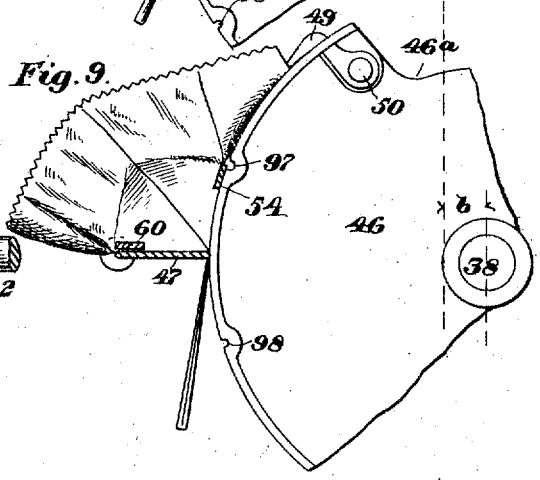
Figure 10:
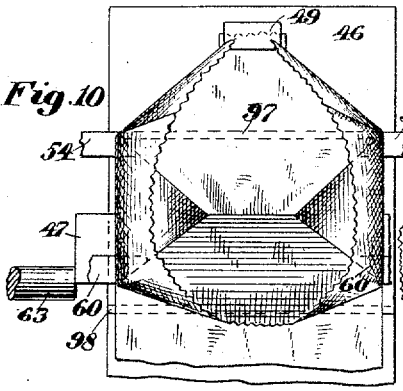
Figure 11:
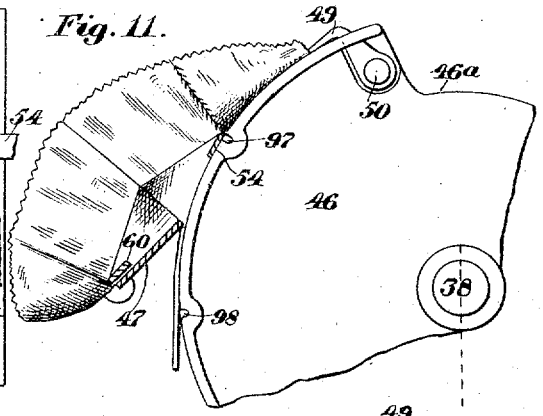
Figure 12:
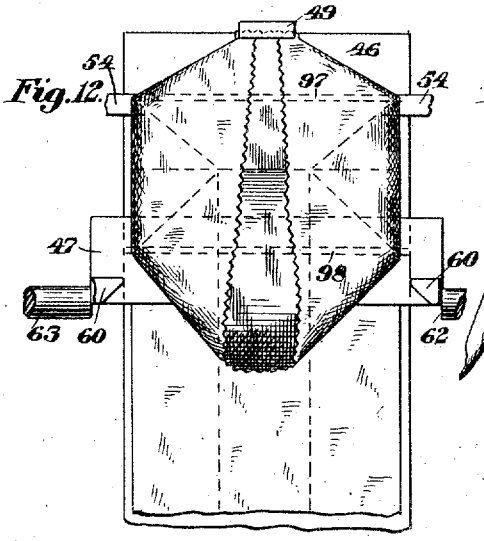
Figure 13:
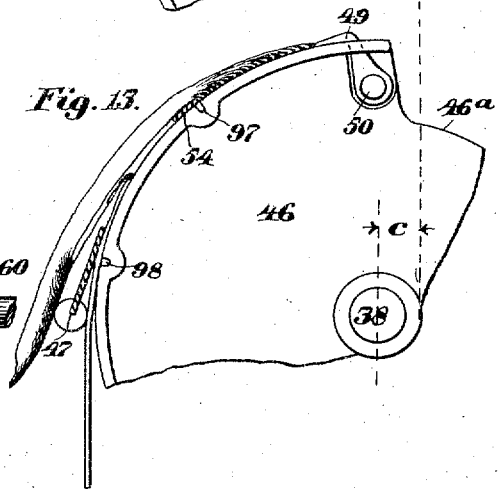

The cam-grooves of the cams 43 and 44 are of such shape as to cause the cylinder 46, which is mounted for rotation upon the shaft 38, which is journaled in the hubs of the upward-extending arms 39 and 40, to vibrate rearward in the direction of the arrow *d* in Fig. 1 upon the shaft 25 the distance required to allow the lower edge of the tucker-plate 47 to clear the cylinder as it oscillates on its trunnions from its extreme downward position, as shown in Figs. 4 and 5, in the direction of the cylinder and passes through the successive positions of Figs. 5, 7, and 9. The distances of the successive positions of that cylinder in its vibratory motion from its first position are indicated in those figures by the letters *a*, *b*, and *c*. The cylinder by the continued action of the cams 43 and 44 then returns (see Figs. 10 and 11) to its first or normal position, (see Figs. 12 and 13,) the tucker-plate having made nearly a half-revolution, as clearly shown in Fig. 13. The combined rotary and vibratory motion of the cylinder produces the successive positions of Figs 5, 7, 9, 11, and 13. The cylinder is provided with mutilations 46ª or broken-away portions, which are disposed with respect to the movements of the cylinder and tucker-plate to permit the tucker-plate to oscillate back to its starting or normal position.

The cylinder is provided with two diametrically opposite spring-advancing front clips, each of which is designated by 49 and is fixed to a shaft 50, and as a means for actuating said clips each shaft 50 has fixed thereto a crank-arm or cam-arm 51, having its inner free end disposed in coöperative relation with the working face of a fixed cam 52, which is shown as a part of the upwardly-extending arm 40. The construction of the working face of the cam 52 and its disposition with respect to successive positions of the clip-axis during the rotation of the cylinder will in practice be such that the cam-arm of the front clip 49 will ride off the working face of the cam 52 just before the cylinder and leading end of the tube have arrived at the positions shown in Figs. 1, 4, and 5, thus permitting the spring 53, which is constructed and arranged normally to exert a closing stress upon the clip 49, to impart an advancing movement to the clip, whereby the lower ply of the tube will be held to said cylinder until the leading end of the tube has arrived in position to be acted upon by the device which folds the front flap or until the inner end of the cam-arm 51 has arrived at a position substantially opposite its blank-engaging position and substantially in horizontal alinement with the axis of the tucker-plate and the axis of rotation of the cylinder, as will be understood by reference to Fig. 1. The cylinder is also provided with two pairs of bevel-edged side clips—that is, with each front clip is a coacting pair of bevel-edged side clips 54, as best shown in Figs. 14, 15, and 16, pivotally mounted on shafts 55 in bosses 56 beneath the folding-surface of the cylinder. Those side clips have pinion-sectors 59, fastened thereto, meshing into racks 59ª, provided with a projection adapted to engage the cam-groove of the cam 57. To render one operation of the clips automatic, allow for wear, and still maintain a grip on the tube, I have provided the clips with advancing-springs 58, which impart a blank-engaging movement to said side clips and hold them firmly but yieldingly in contact with the side edges of the lower ply of the bag-blank. The cam 52, controlling the operation of the front clips 49, the cam 57, controlling the operation of the side clips 54, and the cam 43, which causes the cylinder to oscillate, have their working faces so constructed and disposed and are so timed in their operative effects that after the front clip has engaged the leading end of the lower ply and the blank has been advanced a sufficient distance to bring that transverse portion of the blank in which the front-flap-defining crease is subsequently formed in substantial alinement with the axes of the tucker-plate and cylinder said side clips will be caused to enter the tucks and hold the lower ply of the blank to the cylinder, and the cam 43 will then effect an oscillatory movement of the cylinder away from the tucker-plate axis, the operation of devices which hold the upper ply to the tucker-plate having occurred substantially simultaneously with the operation of the side clips 54 on the cylinder. This operation, which nearly completes the diamond, will be hereinafter more fully described.

The tucker-plate 47, which is shown having a fixed axis of movement, is mounted on trunnions 62 and 63 in the stationary uprights 21 and 22 and has a rotary reciprocatory or oscillatory motion imparted to it by the pinion-sector 64, rigidly connected to the trunnion 63 and meshing into the sector or segment rack 65, which is fixedly connected adjacent the inner face of the upright 22 to the inner end of the shaft 66, journaled in said upright. On the outside of the upright 22 and fastened to the shaft 66 is the upwardly-projecting arm 65ª, provided at its upper end with the projection 67, engaging the cam-groove of the cam 68, which actuates the tucker-plate. The tucker-plate is provided with two oppositely-disposed bevel-edged side nippers 60, pivotally mounted at 69 in the slides 70, which receive a lateral oscillatory motion by means of the grooves 71, in which the projections 72 of the arms 73 are adapted to engage. Those arms are pivotally mounted at 74 upon projecting lugs 75 of the uprights 21 and 22, and the lower ends engage cam-grooves 77 of the rotating cams 78, which are fastened on the shaft 25 and rotate therewith. Springs 79 tend to press the nippers away from the tucker-plate and are bedded in the grooves of said nippers and corresponding opposite grooves in the slides 70. The nippers are closed and pressed to the tucker-plate by means of cones 83, operated by another set of arms 80, also pivotally mounted on lugs 75, having projections 84 upon their lower ends which engage the cam-grooves 81 of the cams 78, and the upper ends of those arms 80 engage in the grooves 82 of those conical slides 83, with the projecting arm of that side nipper resting on the cone on those slides. Therefore as the projections 84, engaging the cam-grooves 81, are in their extreme limit of outward movement the nippers will be pressed to the tucker-plate, as previously stated, and rest upon the conical slides, as clearly shown in Fig. 17. The center line of the trunnions 62 and 63 coincides with a line which passes through the two points of intersection formed by the edges of the tube and the forty-five-degree edges of the nippers. The folding edge of the tucker-plate is located at a distance from the center line of the trunnions substantially equal to the depth of the tucks and serves to define the primary transverse folding-line across the tubular blank as the same is carried onward by the cylinder. The timing of the cam-grooves 77 and 81, which respectively oscillate laterally and open and close and carry the side nippers 60 laterally, the cam 68, by means of which the tucker-plate 47 is oscillated, the cam 52, operating the front clip 49, the cam 57, operating the bevel-edged side clips 54, and the cams 43 and 44, which give the cylinder its oscillatory motion, are all in such relation to the rotation of the cylinder that as the bottom-forming end of the tube enters the folding mechanism it is gripped by the front clip 49. The side clips then enter the tucks and hold the lower fold to the cylinder. The nippers 60 then enter the tucks and hold the upper fold to the tucker-plate. The cylinder is then oscillated away from the axes of the stationarily-trunnioned tucker-plate, the defining edge of which plate is then oscillated toward the cylinder to form the primary transverse folding-line in the tube. The tucks of the tube are distended or unfolded to produce the well-known inside triangular folds, and the side edges of the bottom-forming end of the blank are drawn inward by the distention, whereby to convert the bottom-forming end of the tucked tubular blank of Figs. 4 and 5 into the partly-completed diamond form of Figs. 10 and 11, these operations being due to and taking place during the traveling movements of the cylinder and tucker-plate from the positions thereof shown in Figs. 1, 4, and 5 to those shown in Figs. 10 and 11. When the leading end of the tube has arrived at the position shown in Figs. 10 and 11 by the rotative movement of the cylinder, the cam 43 operates to impart a return oscillatory movement to said cylinder, which, as hereinafter described, retards the rotative movement of the cylinder, relieves the pulling stress on the blank, and completes the diamond. At the completion of this return movement the side nippers 60 are retracted from engagement with the upper ply, thus releasing the blank from the tucker-plate and leaving the same with its diamond-formed bottom portion free to be carried onward by the cylinder away from the tucker-plate.

The paste is applied by the sector 85, fastened to the shaft 86, carrying, connected thereto, the gear 87, meshing with the large intermediate gear 34. The gear 87 also drives the train of gears 88 and 89 on shafts 90 and 91, which have fastened thereto the intermediate paste-sector 92 and paste-roll 93, the latter revolving in the paste-box 94 and from which the paste is delivered to the bag-blank. The gears 87, 88, and 89 are so geared in relation to the cylinder-gear that the face of the paste-sector 85 comes in contact with the surface of the cylinder twice to each rotation of the cylinder, and in this manner the paste is deposited on each bag-blank as it passes along.

The folding of the rear and front flaps is accomplished as follows: The paste-sector 85 has attached thereto the two creaser-blades 95 and 96 at a distance apart, measured upon the circumference of the paster, equal to twice the depth of the tucks, which correspond with the transverse creaser-grooves 97 and 98 in the cylinder. On a projecting lug 99 of the upright 22 is pivotally mounted the arm 100, the upper extension of which has a projection 101, engaging a cam 102, fixed upon the shaft 90, which, as before stated, is driven by the gear 88, and that arm has its lower extension terminating in the sector 103, meshing into the sector-pinion 104, which is fastened upon the shaft 105. This shaft has also fastened upon it the plicators 106, provided with the projections 107, and as the cam 102, which operates these plicators, revolves they are oscillated from a position below the paste-sector 85 toward the guide 108. Just before the oscillation takes place the front creaser-blade 95 forces the blank into the corresponding groove 97 of the cylinder and raises the front flap and the creaser-blade 96 engages the groove 98 and slightly raises the rear flap from the face of the cylinder and the plicators swing from the rearward end of the bag-blank and act to push and turn the flap over into its final position on the bottom of the bag, under the guide 108, where it is loosely held in position. As the blank continues to be carried onward the folder-finger 109 catches into the crease of the front flap and delivers the bag to the delivery-rolls 119 and 120. The folder-finger is mounted and operated as follows: The folder-finger 109 is securely fastened to the shaft 110, which is journaled in the uprights 21 and 22, and carries on the outer side of the upright 22 the arm 111, having pivotally connected thereto the connecting-rod 112, the lower end of which is pivotally connected to the cam-arm 113 by the pin 115. The cam-arm 113 is pivoted on the stud 114, held rigidly on the inner side of the upright 22. The cam-arm 113 has about midway between the stud 114 and the connecting-pin 115 the outwardly-projecting stud 116, engaging in the cam-groove 117 of the cam 118, and that cam is so timed in accordance with the rotation of the cylinder and front-clip cam 52, that operates the front clip 49, that the front end of the first bag-blank is released just before the next blank (not shown) arrives at the position thereof shown in Fig. 1. The first bag-blank being held over the curved surface of the cylinder has a tendency to spring away from the cylinder, and when the front clip is opened and the front flap released the same will be thrown forward, and when the second blank (not shown) arrives at about the position of the first blank (shown in Fig.) 1 the end of the folder-finger 109 will engage the crease formed by the creaser-blade 95 and the cylinder-groove 97 in the first blank and deliver this blank into the delivery-rolls.

The upper front delivery-roll 119 is fixed upon the shaft 121, which carries the gear 122, driven by the gear 123 upon the shaft 124, which carries the lower front delivery-roll 120. The gear 123 is in turn driven by the gear 125 upon the shaft 126, to which is rigidly mounted the gear 127, which is in mesh with, and therefore driven from, the large intermediate gear 34. The gear 125 meshes into the gear 128 upon the shaft 45, which has also secured thereto the lower rear delivery-roll 129. The gear 128 drives the gear 130 upon the shaft 131, upon which is also mounted the upper roll 132.

The operation of the machine is as follows: The tucked-paper tube of proper bag-length is fed, bottom-forming end first, to the bottom-forming mechanism by the feed-rolls 30 and 33, which are so timed as to make two complete rotations to one of that of the cylinder, and which end is so guided that the same enters between the cylinder 46 and tucker-plate 47, the former of which is provided with the front clip 49 for engaging the lower ply of the advanced end of the tube and two oppositely-disposed side clips 54, engaging the side edges of the lower tuck, and the latter of which is provided with bevel-edged side nippers 60, adapted for engaging the side edges of the upper tuck at the advanced end thereof. Just before the leading end of the bag-blank arrives at the position shown in Figs. 4 and 5 the cam-arm 51, fixed to the shaft 50, on which the front clip 49 is mounted, rides off the working face of the cam 52, (shown in dotted lines in Fig. 1,) which permits the spring 53 to operate and advance the front clip into engagement with the front end of the lower ply of the bag-blank, and very soon thereafter the side clips 54 on the cylinder are caused to close upon the lower fold of the blank through the medium of their springs 58 and the cam 57, thus holding the lower fold of the tube to the cylinder. Substantially concurrently with the tube-engaging movement of the side clips 54 the side nippers are then caused to engage the upper ply of the tube and hold the same to the tucker-plate through the medium of the cam-grooves 77 and 81. When the side clips 54 and side nippers 60 have clasped the lower and upper folds, respectively, of the bottom-forming end of the tube to the cylinder and tucker-plate, respectively, an oscillatory movement away from the tucker-plate axis is immediately imparted to the cylinder through the medium of the cam 43, and the lower edge of the tucker-plate is concurrently advanced toward the cylinder to define the primary transverse folding-line in the tubular blank through the medium of the sector 65, as hereinbefore described, and as the rotating cylinder is oscillated away from the tucker-plate axis to the successive positions shown in Figs. 5, 7, 9, and 11 the tucked bottom-forming end of the tube is opened or unfolded and the well-known inside triangular folds formed, converting the tubular blank of Figs. 4 and 5 into the partly-completed diamond form of Figs. 10 and 11. It will be seen that owing to the rotative and vibratory movements of the cylinder away from the tucker-plate axis during the major portion of the diamond-forming operation the bottom-forming end of the tubular blank will be drawn taut and remains in this position until the return vibratory movements of the cylinder, which take place at about the time the cylinder and tucker-plate arrive at the position shown in Figs. 10 and 11, the rotatative velocity of the cylinder being retarded or reduced during the return vibratory or oscillatory movement thereof toward the tucker-plate, owing to the fact that the cylinder oscillates in a path concentric to the axis and in a direction coinciding with the direction of rotation of the gear 36, which rotates said cylinder. Consequently it will be seen that as the cylinder moves bodily toward the tucker-plate the tension upon the tube will be relieved and sufficient slack will be formed in the diamond to permit a retractive or disengaging movement of the side nippers 60 without danger of injuriously spreading or tearing that portion of the tube with which they are engaged. Immediately at the end of the return vibratory movement of the cylinder the side nippers 60 are released, the rotative movement of the cylinder is accelerated, and the bag is carried onward by the rotating cylinder to the paste-sector 85, which applies the paste received from the intermediate paste-sector 92, which takes it from the paste-roll 89. The creaser-blades 95 and 96 on the paste-sector 85 during the pasting operation successively engage the blank and force successive transverse portions thereof into the creaser-grooves 97 and 98, thus raising, respectively, the front and rear flaps slightly from the surface of the cylinder. The plicators 106, with their projecting arms 107, then swing from the rearward end of the bag and push and turn the rear flap over upon the bottom of the bag-blank, where it is held until the guide 108 is reached, when it will be carried under said guide and retained thereby in proper position to have the front flap folded over upon it. Just before the leading end of the bag-blank arrives in position to be operated upon by the front-flap-folder finger 109, or when the extreme leading edge of said bag-blank arrives adjacent the working end of said finger and in substantial horizontal alinement with the axis of the cylinder, the cam-arm 51 of the front clip 49 comes into contact with the working face of the cam 52, which imparts a blank-releasing movement to the clip, thus leaving the front-flap-forming end free to be operated upon by said folder-finger. When the front-flap-defining crease of the blank arrives in proper position with relation to the folder-finger 109, the working end of said finger will be shifted from the position shown in Fig. 1 into engagement with the front end of the blank at the front-crease-defining line, thus folding the front flap backward and carrying the blank downward between the delivery-rolls 119 and 120, which will press the front and rear flaps into their final positions and deliver the completed bag to the rolls 129 and 132, as will be readily understood.

This machine is distinguished from all prior machines for making square-bottomed paper bags in that it carries both plies of the paper tube at the primary transverse folding-line, which is defined by the lower edge of the tucker-plate, forward under the secondary transverse folding-line across the upper ply of the paper tube, (see Figs. 7, 9, and 11,) which is afterward defined by the creaser-blade and the creaser-groove in the cylinder instead of carrying the secondary transverse folding-line backward over the primary transverse folding-line. In this new mode of operation the cylinder has a combined vibratory and a slightly-accelerated rotative movement from its normal position away from the tucker-plate, while it is coöperating with the tucker-plate to make the primary transverse fold and the inwardly-inclined triangular folds during the major portion of the diamond-forming operation, (see Figs. 7 and 9,) and during the last part of this operation (see Figs. 9 and 13) said cylinder has simply a return vibratory movement imparted thereto, the rotation thereof on its own axis being retarded owing to the orbital movement of the driven gear 37 thereon about the driving-gear 36, thus relieving the tension on the tube and facilitating the withdrawal or disengagement of the tucker-plate side nippers without injury to said tube, whereas in every prior machine the folding-bed does not thus oscillate while those folds are being made, but simply holds the lower ply of the paper tube against all oscillation while the upper ply is being turned over backward upon itself.

In the machine herein illustrated the trunnions of the tucker-plate 47 are held perfectly stationary, except as to the rotation during and while both plies of the paper tube are tucked under by the tucker-plate and while the edge of that tucker-plate forms the primary transverse folding-line. The cylinder 46 vibrates away from that tucker-plate a sufficient amount to permit the tucker-plate to pass, (see Fig. 9,) thereby unfolding the tube, and as the tucker-plate continues to recede from the cylinder (see Figs. 11 and 13) said tube is refolded or reshaped into diamond form.

Another feature wherein this machine distinguishes itself from all prior machines is the turning of the rear flap, in that the same is partly raised by the creaser 96, forcing the blank into the creaser-groove, thereby raising the same partly from that cylinder, permitting the ends of the plicators 107 to get back of the same and turn the flap forward under the guide 108. Before this operation takes place the cylinder has returned from the position indicated by the dot-and-dash line in Fig. 1 to the normal full-line position in such figure, as hereinbefore fully explained.

In the machine herein illustrated I have the rotating and vibrating cylinder arranged for two bags—that is, two paper-bag blanks are guided into the bottom-forming mechanism at each revolution of the cylinder; but it is obvious that the details of construction and the general arrangement may be varied to use a one or three bag cylinder without departing from the spirit of my invention herein disclosed.

By the term "oscillatory" movement as applied to the cylinder is meant a bodily movement of said cylinder about an axis independent of its axis of rotation, and by the term "oscillatory" movement as applied to the tucker-plate is meant a rotary or rotary reciprocatory movement about its fixed axis.

By reference to the drawings and to the preceding description it will be understood that as the cylinder recedes from the tucker-plate during the major portion of the operation of forming the diamond in the leading end of the flat tucked-paper tube the upper and lower plies will be gradually carried in opposite directions away from each other, which will cause the opposite side tucks of the bag to be first opened and distended or unfolded outwardly until those portions of said tucks located between the nippers on the tucker-plate and side clips on the cylinder are disposed substantially in the plane of the side edges of the tube, after which they will be drawn inwardly or "refolded" toward each other until their outer edges are in close proximity and in substantial parallelism with the side edges of the tube, thus completing the diamond.

Having thus described my invention, what I claim as new, and desire to secure by Letters Patent, is—

1. A paper-bag machine including a tucker-plate having a fixed axis of oscillation; actuating means for said plate; a cylinder supported for rotative and vibratory movements; means constructed, organized, and timed to simultaneously impart a rotative and vibratory movement to said cylinder away from said plate during one period of the bottom-forming operation; and subsequently to impart a vibratory movement to said cylinder toward said plate and simultaneously retarding the rotation thereof; and coöperative tube-holding and bottom-forming instrumentalities.

2. A paper-bag machine including a tucker-plate having a fixed axis of movement; a rotative cylinder supported for bodily oscillatory movement in coöperative relation with the tucker-plate; means for rotating the cylinder; independent intermittently-operative means for imparting rotary reciprocatory movements to the tucker-plate and bodily oscillatory movements to the cylinder; and coöperative bag-forming instrumentalities.

3. A paper-bag machine including a cylinder supported for rotative and bodily oscillatory movements; means for rotating the cylinder; means for intermittently imparting an oscillatory movement to said cylinder and for simultaneously retarding the rotative movement thereof at a predetermined point in the diamond-forming operation; and coöperative tube-holding and bag-forming instrumentalities including a tucker-plate supported in cooperative relation with the cylinder and having a fixed axis of movement; and means for imparting rotary reciprocatory movements to said tucker-plate.

4. A paper-bag machine including a tucker-plate having a fixed axis of movement; intermittently-operative means for actuating the tucker-plate; a cylinder supported for rotary and oscillatory movements in coöperative relation with the tucker-plate; coöperative cylinder-actuating instrumentalities constructed, organized, and timed to simultaneously impart a rotary and oscillatory movement in coinciding directions to said cylinder concurrently with one oscillatory movement of the tucker-plate, and subsequently reduce the rotative velocity of said cylinder and impart thereto an oscillatory movement in an opposite direction; and coöperative bag-forming instrumentalities.

5. The combination of a rotating cylinder; mechanism to vibrate that cylinder; devices to hold the lower ply of a tucked-paper tube upon the face of that cylinder; a tucker-plate mounted in the stationary frames and provided with a folding edge; means for vibrating that tucker-plate; and devices to hold the upper ply of a tucked-paper tube against the face of the tucker-plate between the line of its trunnions and the line of its defining edge, all coöperating during the rotary and vibratory movements of the cylinder away from and toward the tucker-plate during the first half of the oscillation of the tucker-plate to unfold the tucked-paper tube and reshape the same into diamond form.

6. The combination of a rotating cylinder; mechanism to vibrate that cylinder; mutilations in the circumference of the cylinder; devices to hold the lower ply of a tucked-paper tube upon the face of that cylinder; a tucker-plate mounted in the stationary frames and provided with a folding edge; means for vibrating that tucker-plate; and devices to hold the upper ply of a tucked-paper tube against the face of the tucker-plate between the line of its trunnions and the line of its defining edge, all coöperating during the rotary and vibratory movement of the cylinder away from and toward the tucker-plate during the first half of the oscillation of the tucker-plate to unfold a tucked-paper tube and to refold the same into diamond form.

7. In a paper-bag machine, the combination of a rotating cylinder supported for vibratory movement; mechanism to vibrate that cylinder by a cam; side clips effective for moving toward each other to hold the lower ply of a tucked-paper tube upon the face of the cylinder; the tucker-plate mounted in the stationary frames and provided with a folding edge; and means for vibrating that tucker-plate, side nippers adapted for moving toward and from each other, to hold the upper ply of the tucked-paper tube to the face of the tucker-plate between the line of its trunnions and the line of its defining edge, all coöperating during the rotary and vibratory movements of the cylinder away from and toward the tucker-plate during the first half of the oscillation of the tucker-plate to unfold a tucked-paper tube and to refold the bottom-forming end thereof into diamond form.

8. In a paper-bag machine the combination of a tucker-plate supported for rotary reciprocatory movements about a fixed axis and having tube-holding side nippers; intermittently-operative means for actuating the tucker-plate; means for operating the nippers; a cylinder supported for rotative and oscillatory movements and having peripheral mutilations disposed to come into juxtaposition with the tucker-plate during the retractive rotary reciprocatory movement of said plate; means for rotating the cylinder; and means for imparting an oscillatory movement to the cylinder away from the tucker-plate during the advancing movement of the lower edge of said tucker-plate toward the cylinder, and for returning said cylinder to its normal position, all the parts being combined and operating to distend and unfold the tucked-paper tube and form the inside triangular folds while the cylinder is oscillating away from and toward the tucker-plate which is simultaneously operating to define the primary transverse folding-line across the blank, whereby to convert the bottom-forming end of the blank into diamond form.

9. In a paper-bag machine the combination of a rotating cylinder provided with the front clip and the two oppositely-disposed side clips arranged to swing down upon the lower part of the tubular blank, and hold the same to that cylinder; mechanism to vibrate that cylinder; the tucker-plate trunnioned in the uprights and provided with the side nippers; operating means to vibrate the tucker-plate; and operating means to cause the side nippers to swing down upon the tucker-plate and hold the upper part of the tubular blank, all parts combined and operating to distend and unfold the tubular blank to form the inside triangular folds while the edge of the tucker-plate travels with the combined movement of the rotating and vibrating cylinder in order to define the primary transverse folding-line, substantially as described.

10. The combination of a rotating cylinder; arms in which that cylinder is mounted; cams for vibrating those arms and that cylinder; the tube-gripping device on that cylinder; the tucker-plate; tube-gripping devices on the tucker-plate; and independent instrumentalites for actuating the tucker-plate and tube-gripping-devices, all arranged and operating so that when the tucker-plate swings toward the cylinder, that cylinder vibrates away from the tucker-plate and then returns with the same, substantially as described.

11. The combination of a rotating cylinder; arms in which that cylinder is mounted; cams for vibrating those arms and that cylinder; tube-gripping devices on that cylinder; the tucker-plate; and independent means for vibrating the tucker-plate and for actuating the tube-gripping devices, all arranged and operating so that when the tucker-plate vibrates, the combined motion of the rotating and vibrating cylinder will yield to the folding edge of that tucker-plate, substantially as described.

12. The combination of a cylinder supported for rotative and vibratory movements about independent axes, means for actuating said cylinder, devices to hold one side of a paper tube to that cylinder; a tucker-plate mounted on trunnions and having a folding edge adapted to define the transverse folding-line across the other side of that blank; slides adapted to reciprocate on the trunnions; nippers pivotally mounted to the slides; the conical slides adapted for lateral reciprocation to force the nippers to the tucker-plate, substantially as described.

13. The combination of a rotary and vibratory cylinder; devices to hold one side of a paper tube to that cylinder; a tucker-plate mounted on trunnions and having a folding edge adapted to define the transverse folding-line across the other side of the blank; operating means for oscillating the tucker-plate; slides adapted to reciprocate on the trunnions; nippers pivotally mounted on the slides, the conical slides being adapted for lateral reciprocation to force the nippers to the tucker-plate; and means for actuating the conical slides substantially as described.

14. The combination of a rotary and vibratory cylinder; devices to hold one side of a paper tube to that cylinder; a tucker-plate mounted on trunnions and having a folding edge adapted to define the transverse folding-line across the other side of that blank; operating means for oscillating that tucker-plate; slides mounted on the trunnions; cams for oscillating the slides laterally; nippers pivotally mounted to the slides, conical slides operating those nippers; and cams for oscillating those conical slides laterally to open and close those nippers, substantially as described.

15. A paper-bag machine including a tucker-plate having a fixed axis of movement; actuating means therefor; a rotative cylinder supported for oscillatory movements in coöperative relation with the tucker-plate; constantly-driven means for rotating said cylinder; means for intermittently oscillating said cylinder and for accelerating the rotation thereof during one half of the oscillation and for retarding such rotation during the other half of such oscillation; and coöperative bag-forming instrumentalities.

16 In a paper-bag machine, the combination with a rotary reciprocatory tucker-plate having a fixed axis of movement and also having tube-holding devices in connection therewith, and with actuating means for said tucker-plate and tube-holding devices, of a rotative cylinder supported for bodily oscillatory movements in coöperative relation with the tucker-plate and having tube-holding devices in connection therewith; rotating means for said cylinder and including a cylinder-gear in concentric relation to the axis of rotation of said cylinder and an intermeshing gear in concentric relation to the axis of oscillation of said cylinder; means for imparting an oscillatory movement to the cylinder away from the axis of the tucker-plate concurrently with a movement of said tucker-plate in one direction and for subsequently returning the cylinder to its normal position, the construction, organization and timing of the oscillating and rotating means for the cylinder being such that the rotative movement of said cylinder will be accelerated during the oscillatory movement thereof in one direction and will be retarded during the oscillatory movement thereof in the opposite direction.

17. In a paper-bag machine, diamond-forming instrumentalities including a rotary reciprocatory tucker-plate having a fixed axis of movement and a rotative folding-bed having two independent axes of movement; and independent means for imparting differential rotative movements to the cylinder, rotary reciprocatory movements to the tucker-plate, and concurrent oscillatory movements to said cylinder, substantially as described.

18. A paper-bag machine embodying an oscillatory tucker-plate and a rotative cylinder supported in coöperative relation; means for intermittently oscillating the tucker-plate; means for rotating the cylinder; means for imparting an oscillatory movement to said cylinder away from the tucker-plate concurrently with one oscillatory movement of said plate and for subsequently returning said cylinder to its normal position; and coöperative bag-forming instrumentalities.

Signed by me at Hartford, Hartford county, Connecticut, this 2d day of August, 1900.

GEORGE MORTSON.

Witnesses:

E. C. WHITNEY,

L. C. WOOD.